(12) United States Patent
Bashir et al.

(10) Patent No.: US 8,392,281 B1
(45) Date of Patent: Mar. 5, 2013

(54) SYSTEM AND INTERFACE FOR PROMOTING COMPLEMENTARY ITEMS

(75) Inventors: Umair Bashir, Issaquah, WA (US); Gregor A. Moulton, Seattle, WA (US); Sean M. Scott, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 588 days.

(21) Appl. No.: 12/190,373

(22) Filed: Aug. 12, 2008

(51) Int. Cl.
*G06Q 30/00* (2006.01)

(52) U.S. Cl. ............... 705/26.7; 705/26.1; 705/27.1; 705/26.8; 705/5

(58) Field of Classification Search ............ 705/26.1, 705/26.7, 26.8, 27.1, 5
See application file for complete search history.

(56) References Cited

U.S. PATENT DOCUMENTS

| | | | |
|---|---|---|---|
| 6,266,649 B1 * | 7/2001 | Linden et al. | 705/7.29 |
| 6,317,722 B1 * | 11/2001 | Jacobi et al. | 705/14 |
| 7,346,561 B1 * | 3/2008 | Devitt et al. | 705/27 |
| 7,974,888 B2 * | 7/2011 | Kane et al. | 705/26.7 |
| 2002/0065721 A1 * | 5/2002 | Lema et al. | 705/14 |
| 2002/0072992 A1 * | 6/2002 | Elms et al. | 705/26 |
| 2003/0036930 A1 * | 2/2003 | Matos et al. | 705/5 |
| 2007/0100680 A1 * | 5/2007 | Kumar et al. | 705/10 |

OTHER PUBLICATIONS

Amazon Shopping Screen Interface, http://www.amazon.com, available at least as early as Apr. 2, 2007, accessed at least as early as Oct. 28, 2008.
Amazon PromoPak Interface Test Version 1, http://www.amazon.com, available at least as early as Apr. 2, 2007, accessed at least as early as Oct. 28, 2008.
Amazon PromoPak Interface Test Version 2, http://www.amazon.com, available at least as early as Apr. 2, 2007, accessed at least as early as Oct. 28, 2008.
Amazon PromoPak Interface Test Version 2 Modified, http://www.amazon.com, available at least as early as May 10, 2007, accessed at least as early as Oct. 28, 2008.

* cited by examiner

*Primary Examiner* — Jeffrey A Smith
*Assistant Examiner* — Courtney Stopp
(74) *Attorney, Agent, or Firm* — Knobbe, Martens, Olson & Bear LLP (57) ABSTRACT

A complementary item promoter user interface (UI) is provided that promotes, to a user, items that are complementary to an item of interest to the user. Upon the user's selection of an item of interest, the complementary item promoter UI presents a combination of complementary items selected in accordance with business rules data. The business rules data may be submitted by an administrative user to a content management service that deploys the complementary item promoter UI in a deployment environment. The business rules data may include rules that govern how complementary items are chosen or how they are to be displayed in the complementary item promoter UI.

35 Claims, 7 Drawing Sheets

SYSTEM AND INTERFACE FOR PROMOTING COMPLEMENTARY ITEMS

BACKGROUND

Electronic commerce is an increasingly popular way of selling products and services, referred to herein collectively and interchangeably as "items," to consumers. Activities of electronic commerce typically, but not exclusively, include browsing for items to purchase; comparing various aspects such as price, color, warranties, and the like of items for purchase; inspecting product details of an item; purchasing one or more items; and the like. The popularity of electronic commerce (sometimes referred to as "e-commerce") has prompted more vendors to make their products and services available over electronic networks, such as the Internet, and computer users have correspondingly embraced electronic commerce as a legitimate shopping environment.

Both vendors and computer users benefit from electronic commerce in a variety of ways. For example, users do not have to travel to a number of vendor locales to purchase a given item. Rather, a user can now purchase a desired item from the convenience of his or her home. Further, users can quickly compare a wide variety of similar items and prices from a number of vendors in order to make an informed choice in their purchases rather than spending an entire afternoon comparison shopping. Vendors are benefited in that they can reach a much larger group of customers than those who reside in their geographic vicinity.

Items that are sold in e-commerce are often complementary to one another. For example, a digital camera may have a number of complementary accessories such as batteries, memory cards, and tripods. These complementary items may have a one-to-one or a one-to-many relationship with a base item of interest. In the camera example, the camera may only work with a particular tripod made by the same manufacturer (a one-to-one relationship), while the same camera may work with a wide variety of batteries or memory cards (a one-to-many relationship). While some of these complementary items may be desirable to a user purchasing the digital camera, the user may not know of these relationships or may not have the time to investigate them. Thus, it is desirable for users who interact with e-commerce vendors to be able locate these complementary items easily and for vendors to promote these complementary items to the users to in order to increase sales.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Systems and methods are disclosed for generating a user interface (UI) that promotes items, such as accessories, complementary services, updates, extended warranty packages, etc., that are complementary to a base item of interest. For example, upon a user's selection of an item of interest, a complementary item promoter UI presents a set of items complementary to the item of interest that are selected, in some embodiments, in accordance with one or more business rules. In one embodiment, the business rules govern how complementary items are chosen and/or how they are to be displayed in the complementary item promoter UI. Business rules data may be input by an administrative user to a content management service that deploys the complementary item promoter UI in a deployment environment, such as an e-commerce web site, or a third party environment.

System Overview

Figure 1A:
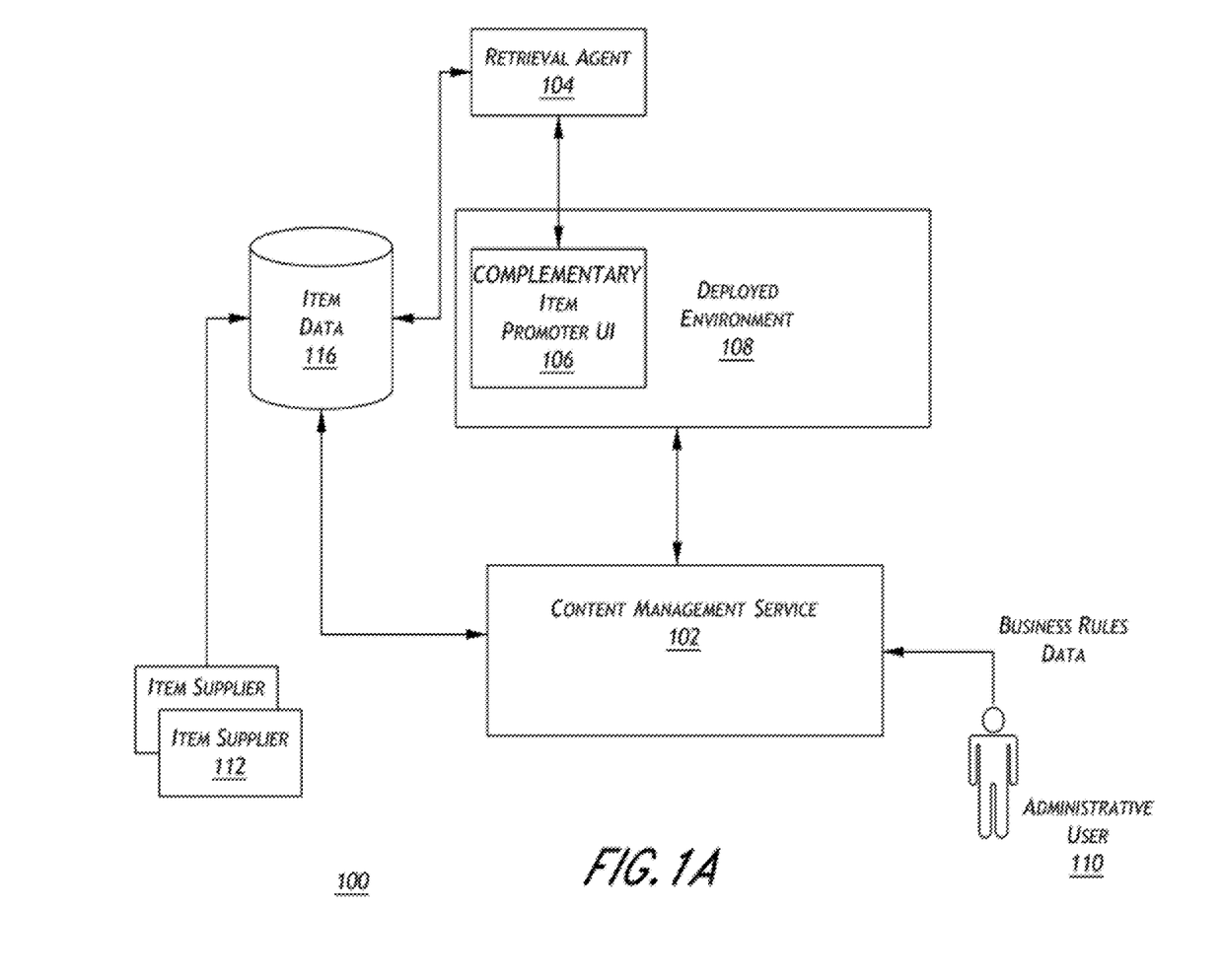
FIG. 1A is a block diagram of an illustrative system in which a complementary item promoter user interface (UI) operates.

FIG. 1A is a block diagram of an illustrative system 100 in which a complementary item promoter UI 106 is used. In one embodiment, the system 100 includes a content management service 102 that enables a user, such as an administrative user 110, to configure and schedule instances of complementary item promoter UI 106 for deployment in a deployed environment 108. The deployed environment 108 may include one or more network resources (e.g., websites), one or more desktop applications, one or more mobile applications, one or more kiosk applications, and so forth.

In one embodiment, a content management service 102 is a software component or web service that manages the content to be displayed in the deployed environment 108. For example, the content management service 102 may cause content to be displayed on various pages of a website within the deployed environment 108. The content management service 102 is further configured to receive business rules data from an administrative user 110. Business rules data are used to define the behavior of instances of the complementary item promoter UI 106 to be executed in the deployed environment 108. For example, the business rules data may include rules defining how complementary items are to be selected, the number of complementary items to be displayed within the complementary item promoter UI 106, and so forth. These business rules are further described below in conjunction with FIG. 4. The content management service 102 may be implemented by a single computing device (e.g., a server) or may be embodied in a plurality of devices, each executing an instance of the content management service.

In one embodiment, the system 100 may include an item data store 116 that may be updated periodically or otherwise originally supplied by one or more item suppliers 112. The updated or supplied data may include item data such as item details as well as price data. For example, if the item data store 116 stores item data for products or services, the item suppliers 112 may be vendors who supply the products or services. As new products or services are introduced into the market, the vendors may supply updated item data to the item data store 116. As such, data within the item data store 116 may be dynamic. The item data store 116 may also or exclusively include item data supplied by an owner or operator of the deployed environment 108.

As shown in FIG. 1A, once instances of the complementary item promoter UI 106 are configured and deployed within the deployed environment 108, the content management service 102 may retrieve item data from the item data store 116 at scheduled runtimes and/or upon the occurrence of a triggering event. Within the deployed environment 108, the display of a complementary item promoter UI instance is based on the business rules data provided by the administrative user 110 and the item data retrieved from the item data store 116. For example, an instance of the complementary item promoter UI 106 may be configured to help customers of an e-commerce retailer locate complementary products and/or services for digital cameras while another instance may be configured to help customers locate complementary products and/or services for laptop computers. The administrative user 110 of the retailer may use the content management service 102 to configure the digital camera instance of the complementary item promoter UI to display, for example, complementary products and/or services such as battery packs, memory cards, and extended warranties and the laptop computer instance to display, for example, complementary products and/or services such as laptop carrying cases, USB flash drives, and service plans. Furthermore, instances of the complementary item promoter UI 106 may be configured to be displayed in the deployed environment 108 at different scheduled times, or to be displayed in accordance with a set of business rules that may select a particular instance from among many to be displayed based on prior customer interactions with those instances. For example, a particular instance that has generated more user interaction may be displayed more frequently. In other embodiments, the business rules data may be automatically generated based on the categorization of item data in data store 116. For example, business rules that identify complementary items for digital cameras may be automatically generated based on categories of items that have been determined to be compatible with digital cameras.

Upon receiving a request from a user in the deployed environment 108, complementary item promoter UI 106 interfaces with a retrieval agent 104 to locate item data. Based on the type of user actions taken with respect to the complementary item promoter UI 106, the retrieval agent 104 retrieves the appropriate data records from the item data store 116 and returns the results to the complementary item promoter UI 106 for display.

System Supporting Deployment in Third Party Environments; Web Service

Figure 1B:
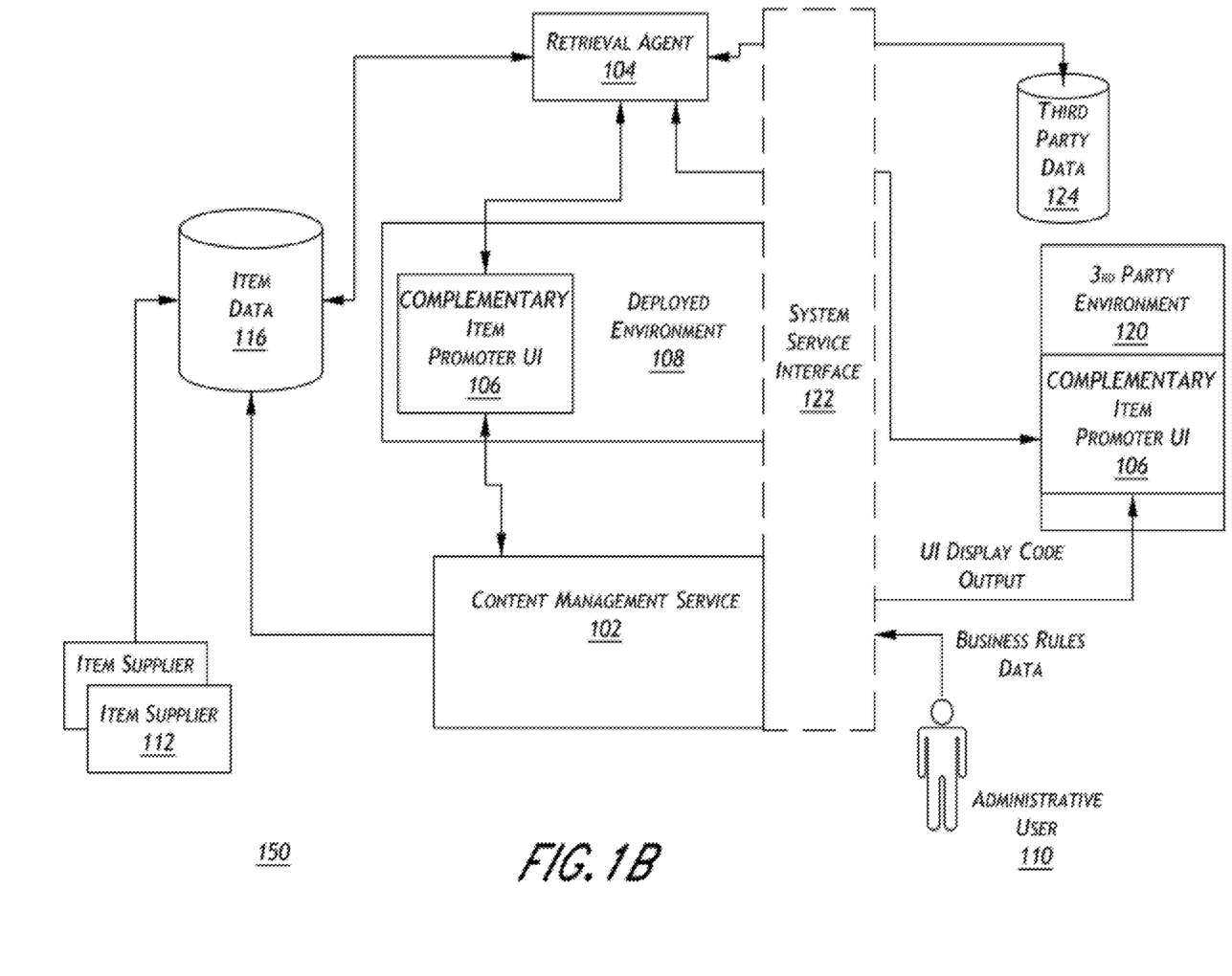
FIG. 1B is a block diagram of another illustrative system in which a complementary item promoter UI operates.

FIG. 1B is a block diagram of another illustrative system 150 in which the complementary item promoter user interface 106 may operate. The illustrative system 150 includes additional components that support the deployment of complementary item promoter UI instances in third party environments. For example, the content management service 102 may be adapted to generate and output code for displaying the complementary item promoter UI 106 in a third party environment 120. The third party environment 120 may be outside of the system 150 and may include one or more network resources (e.g., websites), one or more desktop applications, one or more mobile applications, one or more kiosk applications, and so forth. Components of the third party environment 120, however, may access components of the system 150 through a system service interface 122. For example, the deployed environment 108 may be an e-commerce retailer and the third party environment 120 may be a network resource maintained by a different entity that may have an affiliation with the retailer. An instance of the complementary item promoter UI 106 running in that third party environment may assist users of that network resource to find products or services sold by the retailer.

As a user interacts with an instance of complementary item promoter 106 in the third party environment 120, that instance in turn interacts with the retrieval agent 104 to retrieve the desired item data. In one embodiment, the interaction is facilitated through the system service interface 122. Similarly, a third party administrative user may access the content management service 102 through the system service interface 122 to schedule and configure instances of the complementary item promoter UI 106 to be deployed in the third party environment 120.

In one embodiment, the system service interface 122 operates a complementary item promoter UI web service that can be used by third parties. Through the system service interface 122, the retrieval agent 104 may access a third party data store 124 that stores item data, even if the third party data store 124 may reside outside of the system 150. The retrieval agent 104 returns result third party item data to instances of the complementary item promoter UI 106 deployed in the third party environment 120 in a manner as previously described. Thus, a third party that has a data store with item data and a display environment may connect its system to the complementary item promoter UI web service to take advantage of the complementary item promoter UI in its own display environment. Those skilled in the art will recognize that the third party data store 124 (and item data store 116) may be remote or local to the content management server 102, and/or may be contained within a single data storage device or distributed across multiple storage devices.

Method of Configuration and Operation

Figure 2A:
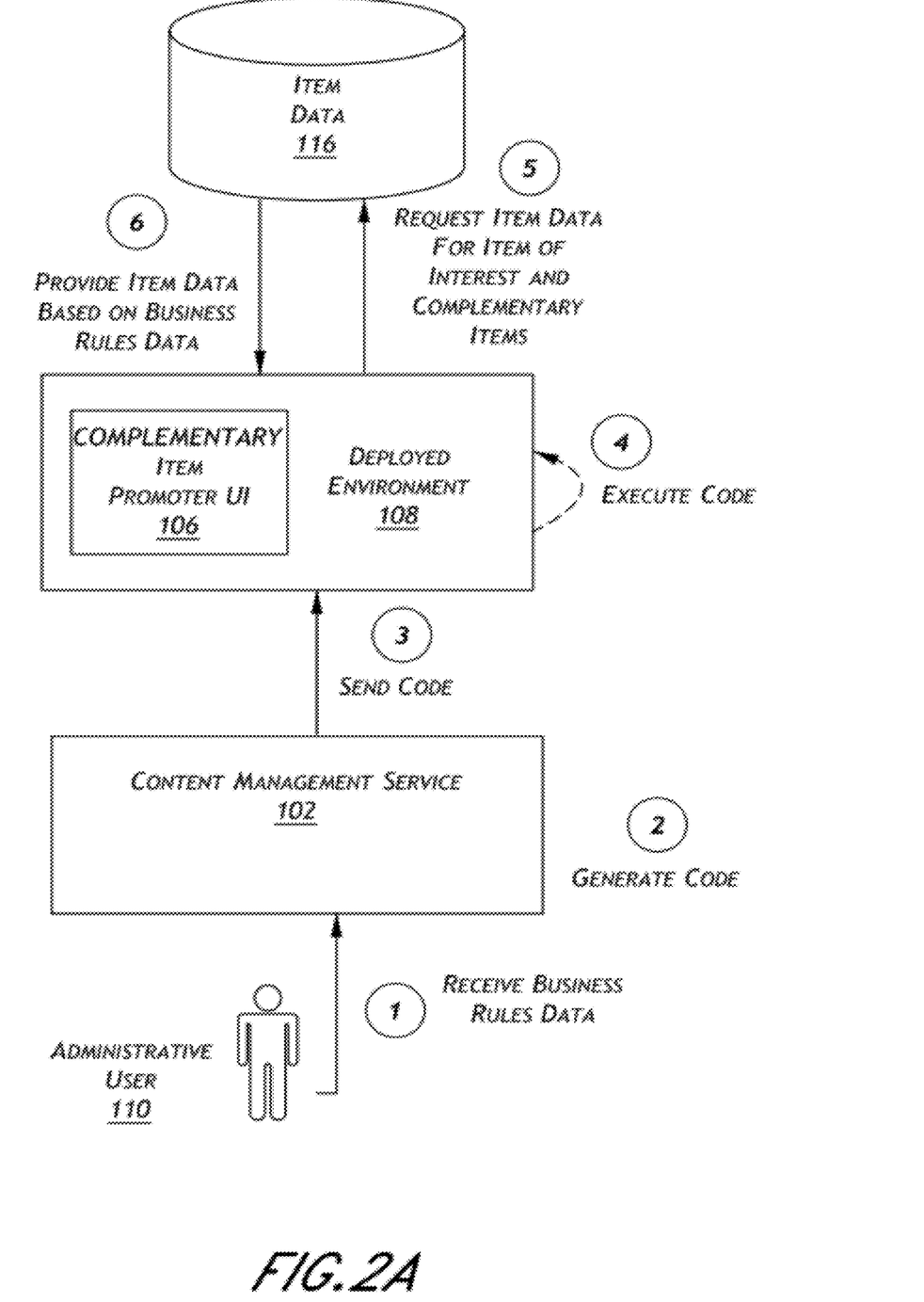
FIG. 2A is a block diagram illustrative of configuration and operation of the complementary item promoter UI within the systems shown in FIGS. 1A and 1B.

FIG. 2A is a block diagram illustrative of configuration of the complementary item promoter UI 106 within a system such as that depicted in FIG. 1A or 1B. As shown in FIG. 2A, the content management service 102 may receive business rules data from the administrative user 110 for instances of the complementary item promoter UI 106. Business rules are used, for example, to define the behavior of the complementary item promoter UI instances, as well as how complementary items are chosen for display in those instances. For example, for an instance of the complementary item promoter UI that is configured to display a digital camera as an item of interest, one example business rule may define that three complementary items are to be selected, and that the items (e.g., memory cards, battery packs, etc.) must be compatible with the manufacturer specifications of the digital camera. The content management service 102 may then generate code for instances of the complementary item promoter UI 106 based on the received business rules data. Once the code is generated, the content management service may send the generated code for instances of the complementary item promoter UI 106 to the deployed environment 108 or to the third party environment 120. The code for an instance of the complementary item promoter UI 106 may be executed within the deployed or third party environment. During the execution, item data for the item of interest and complementary items may be requested from the item data store 116 or the third party data store 124 to populate the display within the scheduled instance. For example, a complementary item promoter UI instance configured for a digital camera may request item data for the camera as well as items complementary to the camera. Such complementary items may include, for example, battery packs, memory cards, service plans, etc. The item data store 116 may provide the requested item data based on business rules data, which may govern how complementary items are to be selected.

Figure 2B:
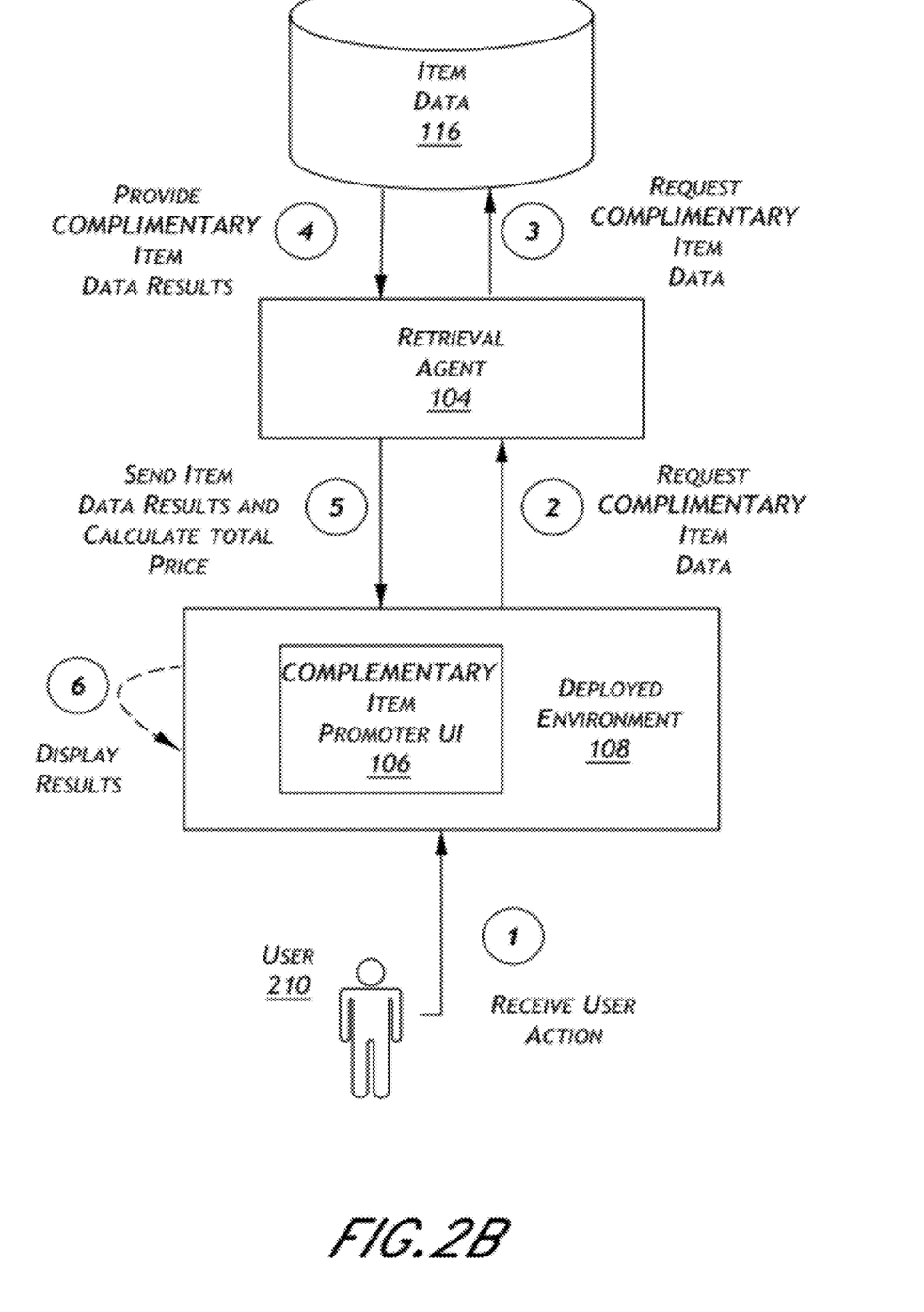
FIG. 2B is a block diagram illustrative of operation of the complementary item promoter UI within the systems shown in FIGS. 1A and 1B.

FIG. 2B is a block diagram illustrative of operation of the complementary item promoter UI 106 within a system such as that depicted in FIG. 1A or 1B. As shown in FIG. 2B, the complementary item promoter UI 106 may receive a user action from a user 210. For example, a user action may include selecting an item of interest, and thus triggering the execution and display of an instance of the complementary item promoter UI 106 in the deployed environment 108 or third party environment 120. The running instance of the complementary item promoter UI 106 may dynamically request complementary item data from the retrieval agent 104 in response to the user action. The retrieval agent 104 may request, from the item data store 116 (or third party data store 124), complementary item data in accordance with previously collected business rules data. The item data results may then be provided to the retrieval agent 104 by the item data store 116. The retrieval agent 104 may send item data results and calculated pricing data back to the complementary item promoter UI 106. In the digital camera example, the data results may include data for the digital camera as well as data for the complementary items such as battery packs and tripods, and pricing data for a combination of items that includes the digital camera and the complementary items. The complementary item promoter UI 106 may then display the results. Alternatively, the results may be displayed on a different page within the deployed environment 108 or third party environment 120.

Configuring the Complementary Item Promoter UI

As mentioned above, item data are retrieved from the item data store 116 (or third party data store 124) when an instance of the complementary item promoter UI 106 is run in accordance with the business rules data received for the instance. In one embodiment, the content management service 102 may include interfaces for receiving such business rules data from administrative users. In another embodiment, an interface is implemented in conjunction with the complementary item promoter UI web service as described in FIG. 1B, so that a third party with its own item data source may use the interface to create and configure instances of the UI to use the third party's own item data.

Complementary Item Promoter UI

Figure 3A:
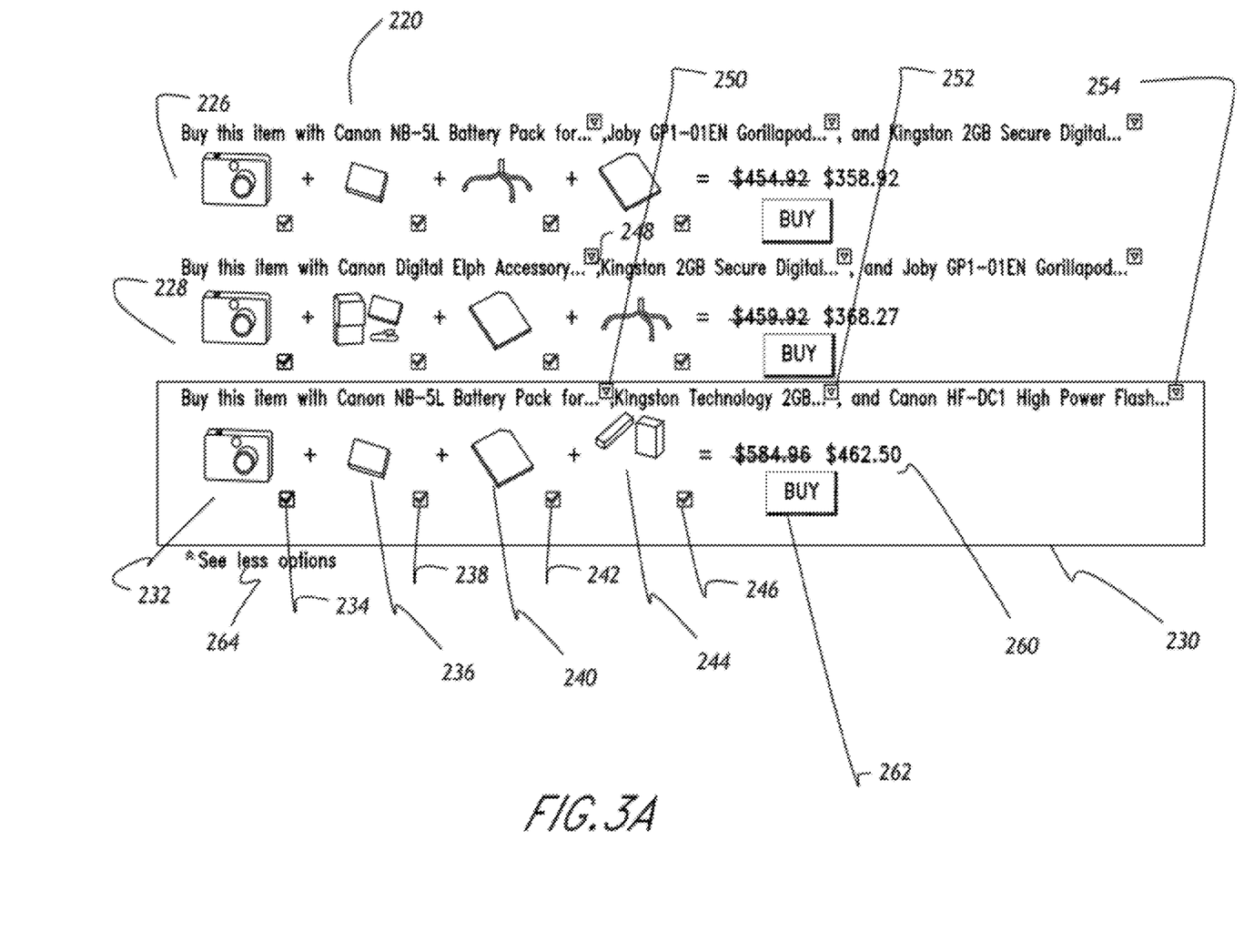
FIG. 3A is a diagram of an illustrative embodiment of the complementary item promoter UI.

FIG. 3A shows a complementary item promoter UI instance 220 presented within the deployed environment 108 or third party environment 120. In one embodiment, the complementary item promoter UI instance 220 is configured and deployed by the content management service 102. In the illustrated embodiment, complementary item promoter UI instance 220 includes combinations of items 226, 228, and 230. A combination of items may, for example, include a base item of interest, and one or more items complementary to the item of interest, so that a user can select the entire combination for purchase. In the e-commerce context, an example combination of items may include a digital camera as an item of interest, and a service plan and a battery pack as two complementary items. The number of combinations of items displayed in a complementary item promoter UI can vary and can be configured by the business rules data.

For example, the combination of items 230 includes an item of interest display 232 and complementary item displays 236, 240, and 244. Although three complementary item displays are shown, the number can vary and can be configured in the business rules data. In one embodiment, each item display includes an image of the item. In other embodiments, an item display may include an image, text, a graphic design, symbol, etc., or combination thereof. The example item of interest depicted in FIG. 3A is a digital camera, and the complementary items shown are: a battery pack in complementary item display 236, a memory card in complementary item display 240, and a flash bulb in complementary item display 244. Within each complementary item display is a selection control (238, 242, 246) whereby a user can select or un-select for inclusion a complementary item that is to be purchased as part of the combination of items. In other words, a user can remove a complementary item from (or add a complementary item to) the combination of items through an associated selection control.

The combination of items 230 may further include a price indicator 260 that may show the price of the combination of items. The price for a combination of items in some embodiments may be a sum of the price of the item of interest and the prices of the complementary items. In other embodiments, it may be a discounted price for purchasing the item of interest and the complementary items together as part of the displayed combination. However, in some embodiments, the price of a complementary item may not be displayed due to restrictions from the item supplier. For example, the price of a hotel room item that is offered as part of a discounted travel combination may not be displayed due to minimum advertised price restrictions placed by the hotel. The price for such items may be displayed later when the user selects the entire combination for purchase. In some embodiments, the price of the combination also may not be displayed until the user selects the combination for purchase. In one embodiment, the price indicator is dynamically updated as the user selects or unselects a complementary item for inclusion in the combination. A combination of items may also include a purchase control 262 through which the user can indicator a desire to purchase the combination. Finally, the complementary item promoter UI instance 220 may include a control 264 through which user can hide or un-hide one or more combinations of items.

Figure 3B:
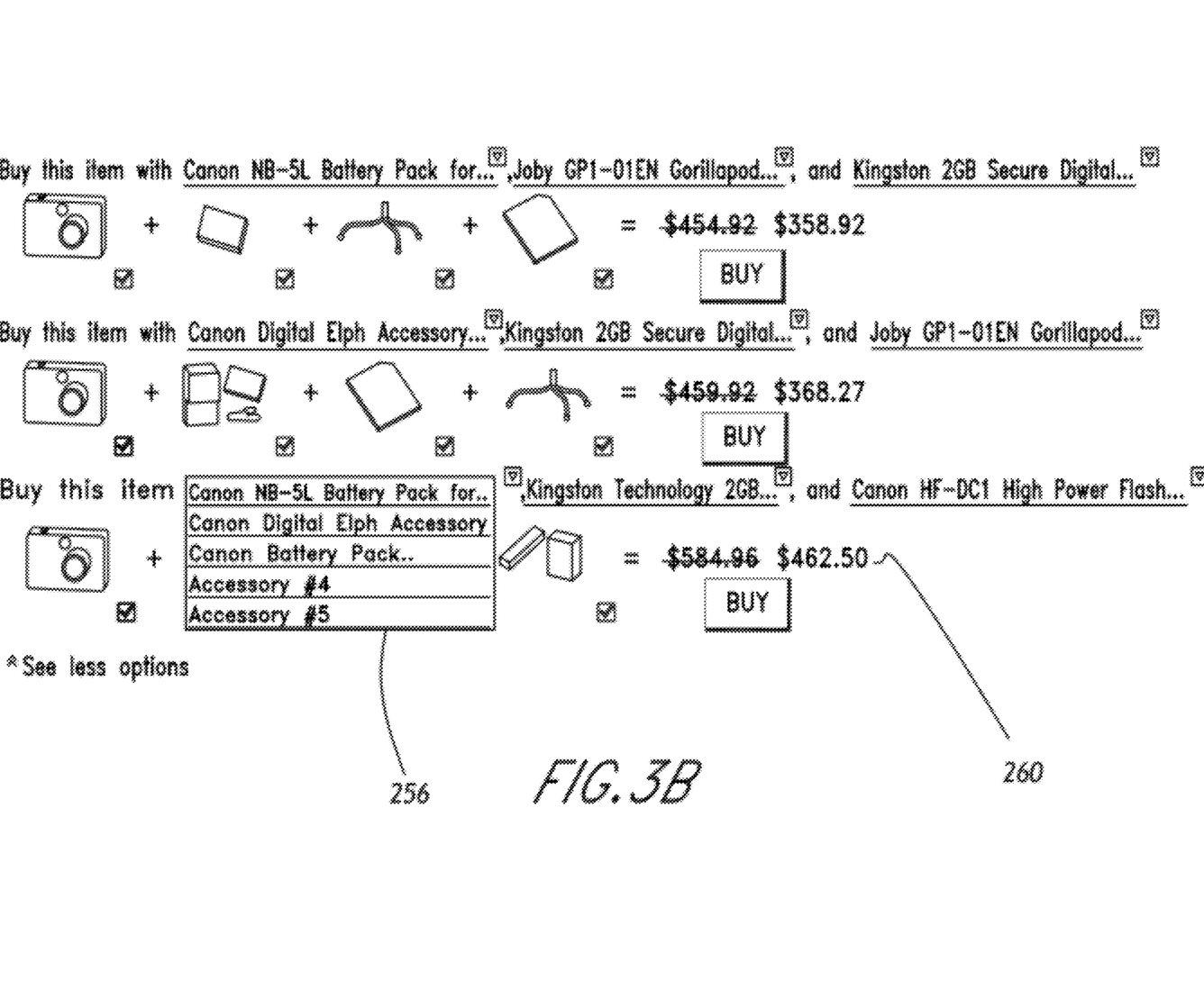
FIG. 3B is a diagram of an illustrative embodiment of the complementary item promoter UI.

In some embodiments, each complementary item display may additionally include a selector (250, 252, 254) through which the user can select substitute complementary items for display and purchase. FIG. 3B illustrates that through the selector 250 the user can access a substitute complementary item list 256. Through the substitute complementary item list 256, the user can select a substitute complementary item for inclusion in the combination of items. For example, the user can replace the battery pack that is in the complementary item display 236 with any item on the substitute complementary item list 256. The user may decide, for example, to replace the battery pack in the complementary item display 236 with another battery pack of a different brand on the substitute complementary item list. In some embodiments, the substitute complementary item list may include a number of items sorted by, for example, name or by prior sales performance or other criteria. Because each complementary item display has an associated substitute complementary item list, when the user chooses to replace one of the complementary items, the other complementary items in the combination of items are not affected. In one embodiment, the price indicator 260 is dynamically updated when the user selects a substitute complementary item.

Data Model

Figure 4:
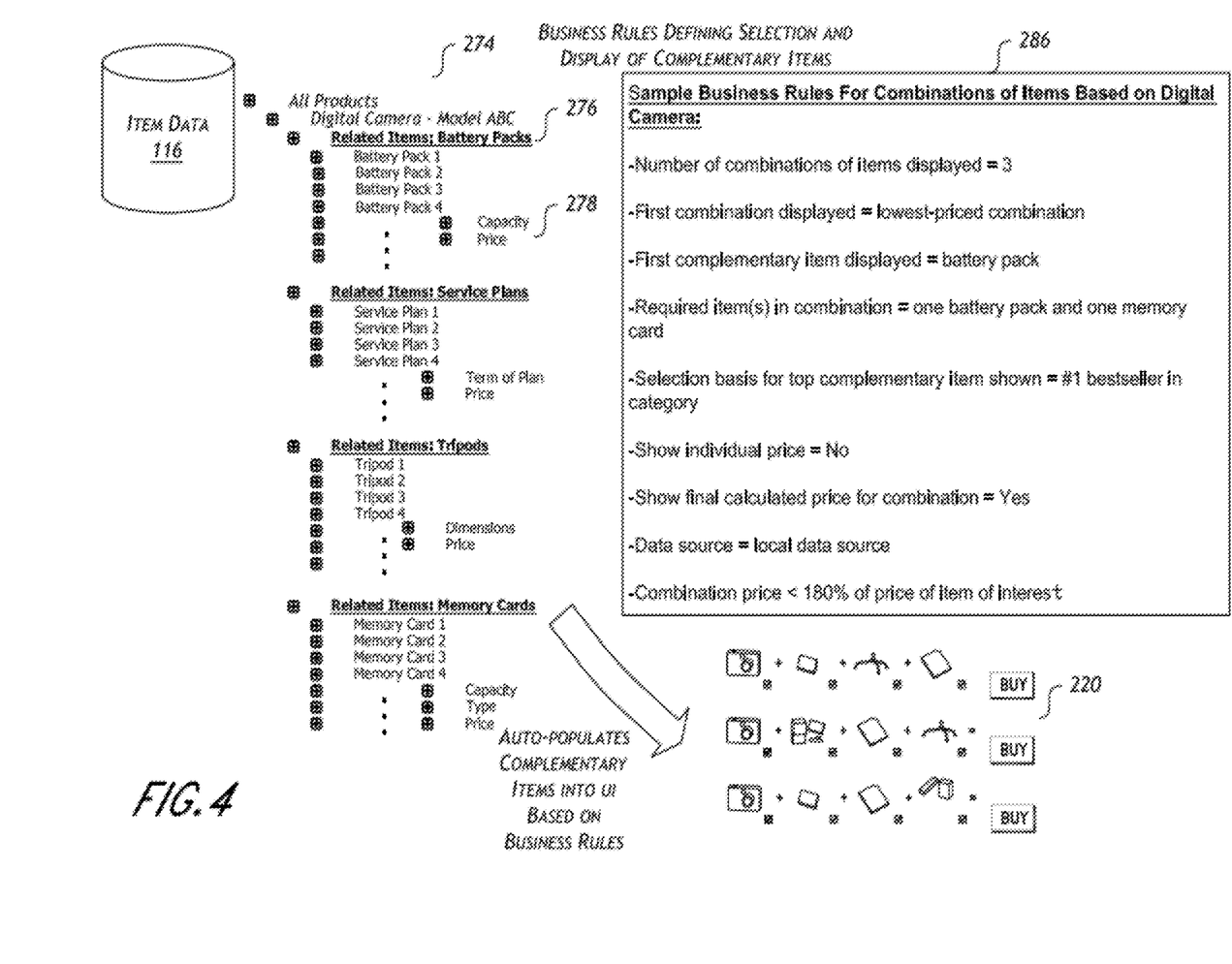
FIG. 4 shows a data model and business rules for configuring an illustrative embodiment of the complementary item promoter UI.

FIG. 4 is a diagram of a sample data model utilized to support an illustrative embodiment of the content management service in configuring and deploying the complementary item promoter UI 106. Data model 274 is illustrative of the data stored in the item data store 116. As shown, the data model 274 includes a number of items that are complementary to an item of interest, which in this case is a digital camera "Model ABC." Here, several sub-nodes of the data model 274 represent complementary item categories for the digital camera, and the example complementary item categories are battery packs, service plans, tripods, and memory cards. In other embodiments, instead of having categories defined for a specific item, the complementary item categories may be defined for a group of items of interest, e.g., a collection of digital cameras made by the same manufacturer or a collection of laptop computers with similar specifications.

The categories may be defined by business rules data 286. For example, business rules data may limit the complementary item categories to those that would match the items of interest. Thus, a snack food category would not be selected as a complementary item category for digital cameras while a battery pack category may be selected. The selection of complementary item categories may also take into account the specification requirements of the items of interest. For example, for laptop computers, specification requirements such as memory capacity, dimension, voltage, system speed, etc. would be taken into account in selecting the appropriate complementary item categories.

Returning to FIG. 4, within data model 274 each complementary item category includes several complementary items. For example, under the battery pack category 276 are several battery packs that are compatible with the specification requirements of digital camera "Model ABC." These battery packs are eligible to be displayed in the complementary item promoter UI when the item of interest is the digital camera "Model ABC." Under each item, additional item data 278 indicates additional information about the item. In the battery pack example, item data may include capacity and price of the battery pack. Other items may have other type of item data. For example, service plans may have term of plan and price while tripods may have dimensions and price. Some of these item data may be sent to complementary item promoter UI for display.

At runtime, the executed instance of the complementary item promoter UI 106 is populated with the complementary items in accordance with the business rules data 286. Besides defining the complementary item categories as mentioned above, the rules within the business rules data 286 may define the behavior of instances of the complementary item promoter UI, as well as how complementary items are to be chosen. Non-limiting example rules include:

The number of combinations of items to be displayed—For example, three combinations are displayed in the sample instance 220. Any number may be used.

First combination to be displayed—This rule defines criteria by which the first combination of items is chosen (e.g., price). In addition, a related rule may define a sort order for the combinations displayed.

First item to be displayed within the combination of items—This rule defines criteria by which the first item is chosen. In addition, a related rule may define a sort order for the items within the combination of items.

Required items in the combination of items—For some items of interest, at least one or more complementary items should always appear in the combination of items. For example, a rule may require that one battery pack and one memory card be included in a combination of items for a digital camera.

Selection basis for each complementary item—As shown in FIG. 3B, the user can replace a complementary item shown with one from the substitute complementary item list 256. This rule defines the selection basis for the complementary item in each complementary item display. For example, the rule may state that the best-selling complementary item is chosen for display. A related rule may define a sort order for the items on the substitute complementary item list. For example, the best selling eligible complementary item may be chosen for display while the remaining eligible complementary items are shown on the substitute complementary item list in reverse order of prior sales volume.

Whether to show the individual prices—If the combination of items offers a discounted price over the combined prices of the item of interest and the complementary items, some manufacturers may prohibit the discounted prices of the individual items from being shown. This rule enables the prices for the items to remain hidden so that only the overall price of the combination of items is shown.

Whether to show the final calculated price for the combination of items—This rule defines whether the total price of the combination of items should be shown.

Data source—This rule allows an administrative user to define where to obtain item data for the complementary items and/or items of interest. For example, a complementary item promoter UI deployed in a third party environment may be configured to use a third party data store.

Maximum price of the combination of items in relation to the price of the item of interest—This rule prevents the selection of complementary items that may cause the price of the combination of items to greatly exceed the price of the item of interest.

Those skilled in the art will recognize that other rules may be implemented without departing from the scope of the present disclosure.

Conclusion

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware. In addition, the components referred to herein may be implemented in hardware, software, firmware, or a combination thereof.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

One skilled in the relevant art will appreciate that the methods and systems described above may be implemented by one or more computing devices, such as a memory for storing computer executable components for implementing the processes shown, for example in FIGS. 2A and 2B, as well as a process unit for executing such components. It will further be appreciated that the data and/or components described above may be stored on a computer readable medium and loaded into memory of computer device using a drive mechanism associated with a computer readable storing the computer executable components such as a CD-ROM, DVD-ROM, or network interface. Further, the component and/or data can be included in a single device or distributed in any manner.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for presenting items complementary to an item of interest to a user, the system comprising:
    a data store that stores business rules data that define complementary items based at least in part on prior sales performance of the complementary items; and
    a computing device in communication with the data store that is operative to:
    retrieve from the data store the business rules data;
    generate one or more combinations of items for selection by the user, each combination of items generated for selection by the user as a unit based on an item of interest selected by the user, each combination including the item of interest selected by the user and one or more items that are complementary to the item of interest, each of the one or more complementary items being automatically selected in accordance with the business rules data; and
    process the business rules data to determine at least one of:
        a combination order for displaying the one or more combinations, and
        a complementary item order for displaying the multiple complementary items in each of the one or more combinations
    cause each of the one or more combinations of items to be displayed to the user in accordance with the business rules data as a pre-selected unit for purchase, with an indication of a total price for the unit; and
    for each of the combinations of items, cause a purchase control to be displayed, the purchase control selectable by the user to initiate a purchase of the item of interest and the one or more complementary items that are pre-selected for purchase together as a unit.

2. The system of claim 1, wherein the one or more items that are complementary to the item of interest are provided by one or more item suppliers.

3. The system of claim 2, wherein the total price is determined based on price data for the complementary items from the one or more item suppliers.

4. The system of claim 1, wherein the business rules data define complementary items based on the specification requirements of the item of interest.

5. The system of claim 1, wherein the business rules data define complementary items based on the price of the complementary items.

6. The system of claim 1, wherein the business rules data define at least one required complementary item for inclusion in the combination of items.

7. The system of claim 1, wherein the one or more combinations of items are displayed in a deployed environment.

8. The system of claim 7, wherein the deployed environment comprises a third party environment.

9. A computer-readable storage medium having a computer-executable user interface component for presenting to a user items complementary to an item of interest, the computer-executable user interface component comprising:
    one or more display elements from which the user can select a combination of items as a unit, wherein the combination of items includes a user selected item of interest and one or more items that are complementary to the user selected item of interest, each of the one or more complementary items being automatically identified based on rules data that define which items are complementary to the item of interest based at least in part on prior sales performance of the complementary items, and wherein the user selected item of interest and the one or more automatically identified complementary items within the combination are displayed as a unit to the user as pre-selected for purchase together as a unit; and
    one or more selectors from which the user selects, from a list of substitute items that are automatically identified based on the rules data, a substitute item complementary to the user selected item of interest, to replace a complementary item in the combination of items displayed as a unit, the list of substitute items displayed in the user interface component upon user interaction with one of the one or more selectors; and
    a purchase control that enables the user to initiate a purchase of the combination of items as a unit.

10. The computer-readable medium of claim 9, wherein the user interface component further comprises:
    a price indicator indicating a price of the combination of items as a unit, wherein the price indicator is displayed with the combination of items in the user interface component and is automatically updated as displayed upon selection of the substitute item.

11. The computer-readable medium of claim 10, wherein the price indicator further indicates a price for each item in the combination of items.

12. The computer-readable medium of claim 10, wherein the user interface component further comprises:
    a selection control that enables the user to remove one of the complementary items from the combination of items.

13. A computer-implemented method for presenting items that are complementary to an item of interest, the computer-implemented method comprising:
    as implemented by one or more computing devices configured with specific executable instructions,
    retrieving from a data store rules data that define complementary items based at least in part on prior sales performance of the complementary items;
    identifying a combination of items including a user selected item of interest and one or more items that are complementary to the user selected item of interest, each of the one or more items being identified as complementary based on the rules data;
    processing rules data to determine an order for displaying the complementary items in the combination;
    causing the display of the combination of items, the user selected item of interest and the one or more identified complementary items in the combination being displayed as pre-selected for purchase together as a unit; and
    causing display of a purchase control through which a user can initiate a purchase of the user selected item of interest and the one or more identified complementary items together as a combination unit.

14. The computer-implemented method of claim 13, wherein the rules data define the complementary items based on the specification requirements of the item of interest.

15. The computer-implemented method of claim 13, wherein the rules data define the complementary items based on the price of the complementary items.

16. The computer-implemented method of claim 13, wherein the rules data define a number of complementary items displayed within the combination.

17. The computer-implemented method of claim 13, wherein the rules data define criteria for selecting a first complementary item for display within the combination.

18. The computer-implemented method of claim 13, wherein the rules data define a type of complementary item to be combined with the item of interest.

19. The computer-implemented method of claim 13, wherein the rules data define one or more substitute complementary items for display to be selected by the user to replace the one or more of the complementary items within the combination that are pre-selected for purchase as a unit.

20. The computer-implemented method of claim 13, wherein the rules data define how price is displayed with the combination.

21. The computer-implemented method of claim 13 further comprising: as implemented by one or more computing devices configured with specific executable instructions, identifying a plurality of combinations including the item of interest, wherein each combination includes the item of interest and items that are complementary to the item of interest.

22. The computer-implemented method of claim 21, wherein the rules data define an order in which the combinations are displayed.

23. The computer-implemented method of claim 21, wherein the rules data define criteria for selecting a first combination for display.

24. The computer-implemented method of claim 21, further comprising:
as implemented by one or more computing devices configured with specific executable instructions, removing one or more of the complementary items from the combination of items in response to a user action.

25. A system for presenting items that are complementary to an item of interest, the system comprising:
a data store that stores rules data that define complementary items based at least in part on prior sales performance of the complementary items; and
a computing device in communication with the data store that is operative to:
generate one or more combinations of items, each combination of items including an item of interest selected by the user and one or more items that are complementary to the item of interest, each of the one or more complementary items being automatically selected in accordance with the rules data; and
cause each of the one or more combinations of items to be displayed to a user as a pre-selected unit for by the user; and
for each of the one or more combinations of items, cause display of a purchase control through which the user initiates a purchase of the item of interest and the one or more automatically selected complementary items pre-selected unit.

26. The system of claim 25, wherein the one or more combinations of items are displayed with an indicator of a total price of the combination of items.

27. The system of claim 26 wherein the one or more items that are complementary to the item of interest are provided by one or more item suppliers.

28. The system of claim 27, wherein the total price is determined based on price data for the complementary items from the one or more item suppliers.

29. The system of claim 25, wherein the rules data additionally define complementary items based on, specification requirements or price of the complementary items.

30. The system of claim 25, wherein the rules data define at least one required complementary item for inclusion in the combination of items.

31. The system of claim 25, wherein the rules data define one or more substitute complementary items for display within the combination.

32. The system of claim 25, wherein the rules data define an order in which the one or more combinations of items are displayed.

33. The system of claim 25, wherein the rules data define criteria for selecting a first combination of items from the one or more combinations of items for display.

34. The system of claim 25, wherein the data store additionally stores item data and the rules data are automatically generated based on categorization of the item data.

35. The system of claim 25, wherein the computing device is operative to generate a plurality of combinations of items and cause each of the plurality of combinations of items to be displayed for selection as a combination by the user.

* * * * *